INVENTOR.
JOSEPH A. SHARPE
BY
Kenyon & Kenyon
ATTORNEYS

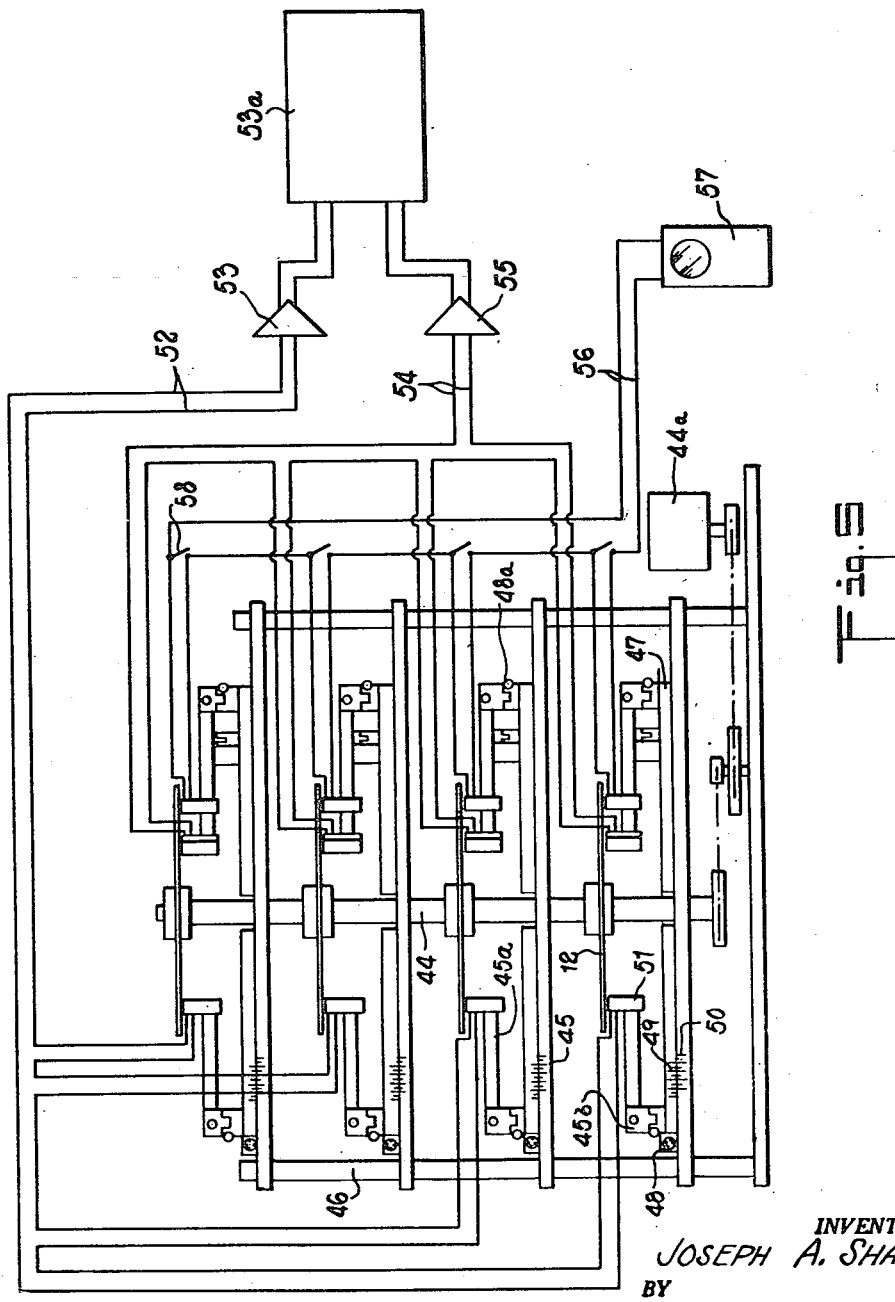

2,795,287

Patented June 11, 1957

United States Patent Office

2,795,287
APPARATUS FOR SEISMIC REFLECTION MAPPING

Joseph A. Sharpe, Tulsa, Okla., assignor, by mesne assignments, to Seismograph Service Corporation, Tulsa, Okla., a corporation of Delaware Application April 8, 1952, Serial No. 281,105

4 Claims. (Cl. 181—.5)

This invention relates to geophysical prospecting and particularly to a method and apparatus for seismic reflection mapping.

A commonly employed method of geophysical prospecting for subsurface geologic structures favorable to the accumulation of oil and/or gas is the seismic reflection method. In this method a hole is commonly drilled through the surficial low velocity layer, which may be as thin as 10 feet or as thick as 300 feet, but which is typically of the order of 50 feet thick. Vibration detectors, called geophones, are disposed usually in a linear array on one or both sides of the drilled hole, with the drilled hole usually lying in the line of the geophones, although it may at times be offset from the line of the array of geophones.

The geophones, which are usually electromechanical transducers, are connected by electric cable to a convenient central location, where the electrical signal corresponding to earth vibration received at each geophone is conducted through an amplifier, which commonly is provided with automatic gain control means and means for electrical filtering against frequencies outside the band of about 20–160 C. P. S. within which the seismic information of interest is contained. The output of each geophone-amplifier channel is fed to an element of a multi-trace oscillograph recorder of the galvanometric type, recording as function of time on moving photographic paper.

A small charge of explosive is fired under water tamping at some point in the drilled hole below the base of the low velocity layer where experiment has indicated best results are obtained, the act of firing the explosive generating a simultaneous electrical signal, which, applied to one of the traces of the recorder, indicates the instant of detonation of the explosive.

The detonation of the explosive generates elastic wave energy, principally in the form of dilatational wave motion, which spreads out in all directions in accordance with the physical laws governing the propagation of such energy. The first energy which arrives at a geophone displaced some distance from the shot point will be that which has travelled below and near the base of the low velocity zone, and has refracted through that zone to the geophone. Later arriving energy consists of a mixture of low frequency (5–15 C. P. S.), low velocity surface waves which may have been generated by the impact of the spherical wave front from the explosion at the surface of the earth overlying the explosion; energy derived from reflection at subterranean surfaces of contrast of acoustic impedance, ordinarily conformable with stratigraphic horizons; and other energy occupying approximately the same portion of the spectrum as the reflected energy.

A multiplicity of geophone-amplifier-recorder channels ranging from 12 to 24 is ordinarily used, with geophones spaced at an interval of 100 feet or less. Employment of a multiplicity of channels aids in the recognition of the arrival of reflected wave energy: since such energy arrives at all geophones at very nearly the same time since the extension of the geophone array is ordinarily small compared to the depth to the reflecting horizons; and since the waveform of the reflected energy from a given reflector is substantially identical at all geophone positions. The low frequency, low velocity surface wave energy mentioned above is easily recognizable on the recordings, and interference from this source is easily eliminated by employment of suitable electrical filtering.

From the interval of time elapsed between the detonation of the explosive and the arrival of the successive reflected events, and the determinable velocity of propagation of seismic waves as a function of depth, the depth to the various reflectors may be computed, and cross-sections and/or contour maps may be made showing the presence of subsurface geologic situations favorable to the accumulation of oil and/or gas.

Instrumentation and procedure essentially equivalent to that outlined in the paragraphs above sufficed to yield useful seismic reflection recordings in the areas of first application of the seismic reflection method, namely, in the Seminole Plateau area of Oklahoma, the central Kansas uplift, and many portions of the gulf coast of Texas and Louisiana. Efforts to extend the application of the method into other areas, however, were less successful, since it was frequently not possible to record clearly the arrival of reflected events, due to the presence of other energy occupying substantially the same portion of the spectrum, but apparently random in character from geophone position to geophone position.

In the effort to improve the recognizability of reflected events in the presence of the interfering energy, the separation between geophones was sometimes decreased, the pass band of filtering was decreased to the extent possible without deterioration of the recording of reflected energy, and multiple selection of the choice of filter high and low frequency cutoffs was made available.

Further effort at improvement was made by the employment of several geophones per amplification and recording channel, as a means for gaining a statistical improvement of signal-noise ratio, in the expectation that signal would add algebraically, as long as the spacing between the first and last geophones of a group was not excessive, and that noise would add statistically, i. e., in proportion to the square root of the number of geophones per group, as long as the spacing of geophones was sufficient. Two, three, six, and as many as twelve geophones per recording channel have been employed. Improvement has generally been observable, although the amount of improvement has not been nearly as great as would be expected on the basis of the assumption of noise independent in phase and amplitude at each geophone within a group. The improvement at some shot points has been spectacular, at others negligible.

As a means of accomplishing somewhat the same result as the employment of a multiplicity of geophones per recording channel, methods of sharing the energy between a channel and adjacent channels, such that, for example, one-half the energy of a given channel appears in adjacent channels, one-fourth in the next adjacent channels, etc., have been employed. This procedure has the effect of simplifying the process of moving from one trace to another on what is thought to be a reflection pick, but is open to serious criticism as to whether many of the picks as followed through are actually continuous reflections.

Despite the above-described efforts of those skilled in the art of seismic reflection prospecting, many important petroliferous areas remain in which, although suitable reflectors are available in the subsurface, the ratio of reflected energy to other energy (the signal-noise ratio), is so unfavorable as to make reflection seismic mapping impossible, or, at best, extremely unreliable, necessitating dependence on other geophysical methods of low resolving power. Southwestern Kansas, the Oklahoma and Texas Panhandles, much of the Anadarko Basin of western Oklahoma, the Edwards Plateau of west Texas, and southeastern New Mexico, are a few of the many areas in which this situation prevails.

Now it appears that the source of the interfering energy observed on seismic reflection recordings lies in the existence within and near the low velocity zone, of localized variations in acoustic impedance which serve as centers from which both the primary elastic wave energy spreading out in all directions from the shot and other energy derived from this can be scattered in all directions. Among the causes for such localized variations in acoustic impedance are topography on both the top and bottom surfaces of the low velocity zone; buried drainage patterns; differences in the weathering of rocks, particularly of anhydrite, as found in the area of outcrop and shallow burial of the Blaine gypsum formation in western Oklahoma; recent volcanic necks and lava flows, as found, for example, in the Marfa Basin of southwest Texas; fissuring and jointing, as in the massive limestone found at or near the surface in the Edwards Plateau of west Texas; and the existence of discontinuous masses of caliche (sometimes called "desert limestone"), in west Texas.

The intensity of the scattered wave energy in the vicinity of the geophone array depends on the number, distribution, and effectiveness of the sources of scattering at distances up to a mile or more (round-trip travel times up to 2 seconds or more) from the shot point. In relation to the energy of reflections the scattered energy, geometrically attenuating substantially as a two-dimensional propagation following an inverse first power law, gains over the reflected energy which geometrically attenuates as a three dimensional propagation following an inverse square law.

With a multiplicity of scattering centers randomly located with respect to the geophone array, the resultant noise energy is highly random in both time and space, as a result of reinforcement and cancellation of wave motion arriving from all directions. This explains the erratic improvement in signal-noise ratio observed when multiple geophones are employed. If the majority of the scattering centers are located substantially in line with the geophone array, a spectacular improvement in signal-noise ratio is observed as compared to employment of a single geophone per recording channel. If the majority of the scatterers are substantially offside to the array, the improvement is negligible.

The object of the present invention is to provide a method and apparatus for seismic reflection geophysical mapping by means of which seismic recordings can be obtained in which the ratio of signal (reflected wave energy) to noise (scattered random wave energy) is substantially improved, permitting the conduct of successful reflection seismic surveys in areas of high level of random wave energy.

The method phase of this invention embraces the production of an adequate number of individual seismic recordings for each of which the waveform and time relationship of the reflected events is substantially unchanged; except possibly for constant, known time differentials such as are the result of variations in the thickness of the low velocity zone or the depth of shooting, and except possibly for monotonically decreasing small known time differential functions of reflection arrival time which are the result of variations in relative location of shot-point and geophone array; but for each of which recordings the amplitude and phase of the noise energy at corresponding geophone positions is substantially random; and, finally, algebraic super-positioning of the various recordings at corresponding geophone positions, with due allowance for any constant and variable time differentials, yielding a new recording with signal added algebraically and noise added statically.

The seismic recordings with reflection waveform substantially invariable and noise energy at corresponding geophone positions substantially random from recording to recording are made by changing the depth at which the explosive is detonated (effective for scatterers lying very near the shot point); changing from one geophone array to another with explosions detonated in the same drill hole; and changing from one drill hole to another, with the location of the geophone array remaining fixed; or combinations of all three or of any two of these.

The seismic recordings can be of conventional galvanometric type, with the algebraic addition of the corresponding traces carried out by measuring and tabulating the ordinates for each corresponding trace for each millisecond following the instant of explosion; if necessary applying a constant relative time correction for depth of shooting and/or low velocity zone transmission time difference; if necessary applying a monotonically decreasing relative time correction appropriate to difference in distance from shot-hole to geophone; summing the results for corresponding traces; and plotting the sum for each trace as a function of time.

However, the labor involved in the above-out-lined method is tremendous, and the object of the apparatus of this invention is to provide means to accomplish this method rapidly, automatically, and with flexibility in the insertion of any constant and variable time corrections required, the latter of which are a function of the velocity-depth relationship, which is not always accurately known.

In the apparatus of this invention the original individual seismic recordings are of phonographically reproducible type, made in accordance with any of the techniques well known in the art of sound recording—mechanical, magnetic, or as variable area or variable density tracks on film or sensitized glass plates. The summation of corresponding traces is accomplished by successively or simultaneously scanning the recordings of corresponding traces by scanning means appropriate to the recording medium, with introduction of any constant relative time difference required by means providing relative offset of the scanning head and recording medium, and with introduction of any small variable relative time difference required by means slowly changing the relative offset of the scanning head and recording medium in accordance with the velocity-depth relationship applicable; and with summation and recording of the corresponding traces effected by appropriate means.

The new method and apparatus are disclosed hereinafter by the use of specific examples schematically illustrated by the accompanying drawings in which:

Fig. 5 is an elevation view showing the summation or compositing equipment and the arrangement for recording the end result, including the circuit required.

Figure 1:
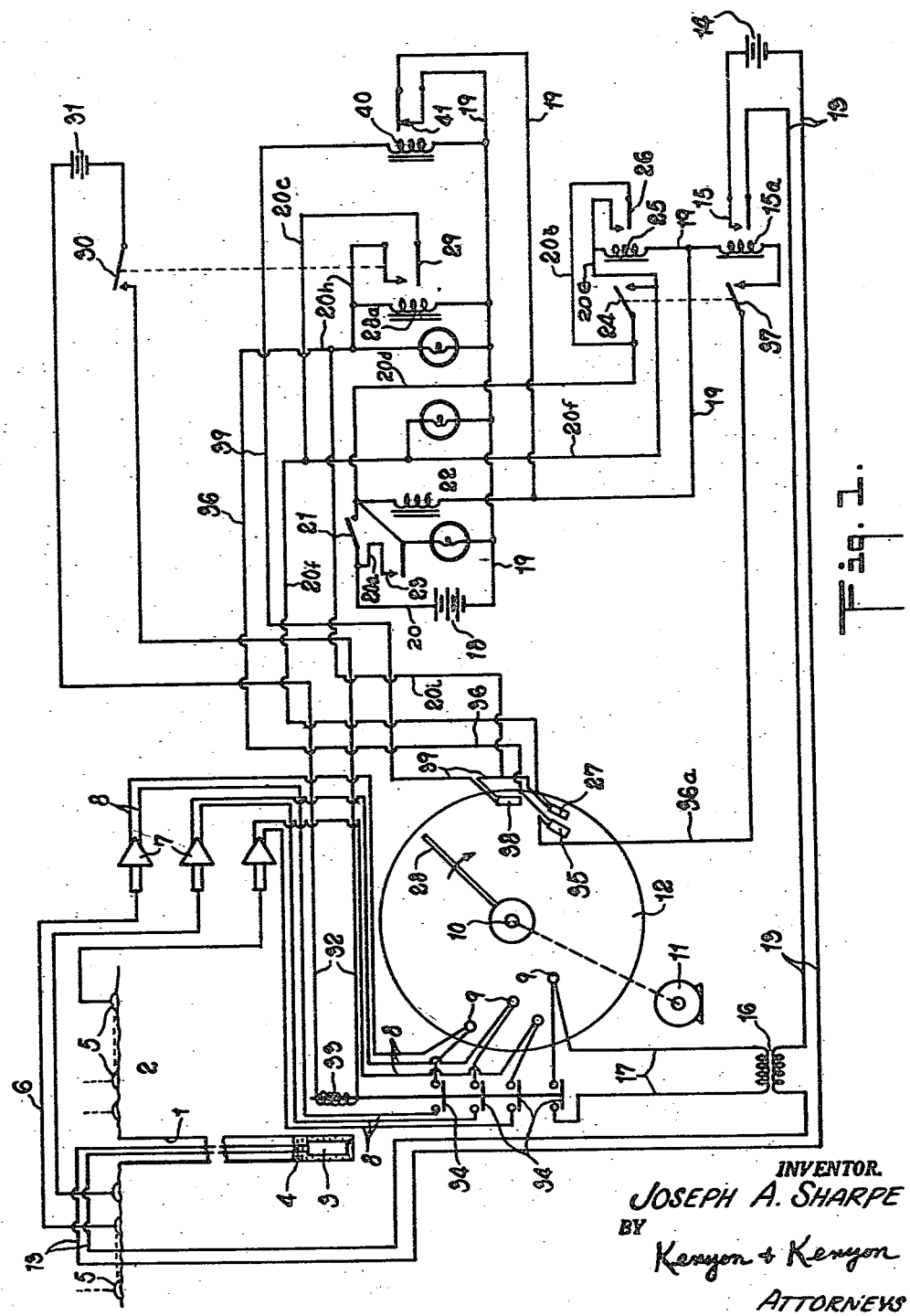
Fig. 1 shows in vertical section, a portion of the earth in which a shot-hole is bored with a geophone array on the earth's surface, and circuits required for operation and for the recording, the record being a disk shown as a plan view.

Referring first to Fig. 1, a shot-hole 1 is bored in the earth 2 with the explosive charge 3 in the bottom of the hole 1 and tamped by a suitable material such as water 4. Geophones 5 are arrayed on the earth's surface on either side of the mouth of the bore hole 1, it being understood that although in this figure only a relatively few of the geophones are shown that any of the previously described arrays may be used. Each geophone is connected by a multi-conductor cable 6 with its amplifier 7, the output of which is connected by a multi-conductor line 8 to a magnetic recording head 9 which may be of the type used for magnetic tape recording and the like. There is one of these heads for each geophone. A rotary spindle 10 is connected by a suitable drive with a motor 11, precautions being taken to the end that the spindle 10 is rotated at as constant a rotary speed as is possible. A magnetic recording disk 12 is mounted by this spindle 10 so as to be rotated thereby. This disk may be a glass disk having a coating of magnetically retentive material. The various recording heads 9 are disposed around the spindle in such a fashion that each may make a circular trace which does not overlap the trace of any other head. Only a few of these heads are shown, so as to avoid confusion in the drawing.

The explosive charge 3 is connected by a multi-conductor cable 13 with the detonating potential, such as a battery 14, under the control of relay contacts 15. The primary of a transformer 16 is connected in circuit with the lines of the cable 13 and the output of the secondary of this transformer is fed through lines 17 to one of the recording heads 9.

When the relay contacts 15 close the battery 14 applies detonating voltage to the charge 3 so that a shot impulse is applied to the earth. At the same time, through the transformer 16 the one of the recording heads 9 connected to the secondary of this transformer records the shot instant on the disk 12 as one of the traces. Any vibrations picked up by the geophones 5 are also recorded as separate traces on the disk 12. A timing signal may also be placed on the one of the recording heads 9 used for the shot instant, by introducing across lines 17 a small fraction of the alternating voltage of carefully controlled constant frequency used to drive motor 11.

A control circuit is required to assure that the recording heads 9 are activated prior to the shot instant, and to assure that they are deactivated prior to any recording head starting a retrace over the one it has just made. This is the function of the control circuit shown in Fig. 1 and described below.

In this control circuit a battery 18 has one pole (illustrated as the negative pole) connected to a line 19 and its other pole connected through a line 20 to a normally-open manually controlled switch 21 which, when momentarily closed, connects control coil or solenoid 22 of a relay across the battery. Specifically, actuation of the switch 21 connects one side of relay coil 22 to the positive terminal of the battery 18 while the other side of this coil is connected to the negative side of the battery through line 19 and through normally closed contacts 41 of a relay to be described more fully hereinafter. Energization of the control coil 22 closes contacts 23 associated therewith in order to connect the control coil through branch line 20a to the positive terminal of battery 18, thereby to seal the coil across the battery even after the switch 21 is released. The line 20 is connected through conductor 20d to a normally-open manually operated switch 24 which, when momentarily closed, energizes control coil or solenoid 25 of a relay by way of conductor 20c. Energization of the control coil 25 closes contacts 26 associated therewith and, as a result, the control coil is sealed across the lines 19 and 20 through a branch circuit including conductor 20b and the contacts 26 even after the switch 24 is released.

After the switches 21 and 24 have been actuated, the positive terminal of the battery 18 is connected through conductor 20f to a normally-open limit switch 27 positioned adjacent to the spindle 10. The switch 27 is adapted to be engaged by an arm 28 carried by the spindle 10 and rotatable with the disc 12 for the purpose of momentarily closing the contacts of the limit switch as the arm is brought into engagement therewith.

The limit switch 27 functions as a starter switch by virtue of the fact that when closed this switch connects the positive terminal of the battery 18 through conductor 20i to one end of a solenoid or control coil 28a of a relay. Since the other end of the control coil 28a is connected directly to line 19, actuation of the limit switch 27 energizes control coil 28a in order to close normally-open contacts 29 with the result that branch line 20c connected to conductor 20f seals the control coil 28a across the battery 18 even after the arm 28 is moved out of engagement with the starter switch 27. Energization of the solenoid 28a also closes normally-open contacts 30 through which a battery 31 is connected by lines 32 to the solenoid 33 of a relay having normally-open contacts 34 interposed in each of the lines 8 connecting the outputs of the amplifiers 7 with the head 9. One set of these contacts 34 is also interposed in the lines 17 connecting with the shot point instant recording head 9. It follows that when the arm 28 actuates the starting switch 27 so that the solenoid 28a is energized, all of the recording heads 9 are simultaneously actuated. It will be understood that prior to the actuation of the limit switch 27 all of the recording heads 9 are disconnected from their respective signal sources.

A second micro limit switch 35 is positioned for actuation by the arm 28 a short time after the actuation of the starting switch 27. The micro limit switch 35 functions as a shooting switch and is of the normally-open type which, through its contacts, connects a line 36a to conductor 20h. The latter conductor is connected to the positive side of the battery 18 after the above-described operation of the starting switch 27 has occurred. As a consequence, energization of the limit switch 35 connects the positive terminal of the battery 18 through conductor 36a and through the contacts 37 of a normally-open manually controlled switch, to one end of a solenoid or control coil 15a having its other end connected directly to the conductor 19. Actuation of the solenoid 15a closes contacts 15 associated therewith and causes the battery 14 to detonate the charge 3 through the lines 13. It should be observed that both of the switches 24 and 37 must be manually closed in order to effect the detonation of the charge, and preferably these two switches are interconnected for simultaneous actuation. It should also be observed that the line 36a cannot receive power from the line 20 unless the starting switch 27 has first connected the conductors 20h and 20i to the positive terminal of the battery 18 in the manner described above.

The diameter of the disc 12 and its rotating speed must be such that all of the useful reflections are recorded prior to the instant when the head 9 begins to retrace. Recording is, of course, proceeding during the present phase of this description.

As the arm 28 is brought into proximity with the starting switch 27, this arm first encounters and actuates a third normally-open limit switch 38 which is interposed in a line 39 connecting the conductor 20i to one end of a solenoid or control coil 40 of a relay switch, the other end of this solenoid connecting with the line 19. The latter relay includes normally closed contacts 41 inserted in the line 19 through which the circuits are established for energizing the solenoids 22 and 25 in the manner previously described. Momentary opening of the contact 41 by the actuation of the switch 38, which functions as a stop switch, momentarily deactivates the solenoids 22 and 25 so that their respective sealing contacts 23 and 26 open and unseal the holding or sealing circuits for the solenoids. This also de-energizes the solenoid 28a so that both its sealing contacts 29 and its contact 30 are opened to de-energize the coil 33, thus permitting all of the contacts 34 to open and disconnect the head 9 in order to prevent these heads from re-recording on the same traces of the disc 12.

Figure 2:
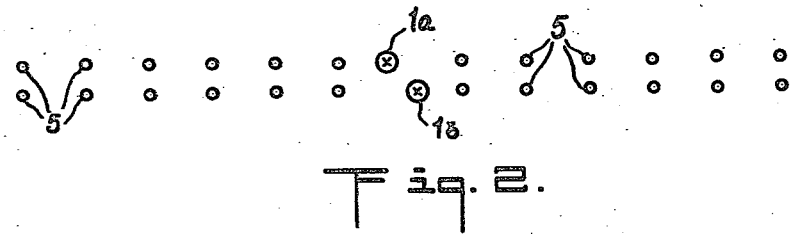
Fig. 2 is a plan view showing a suitable geophone array.

Referring now to Fig. 2 two bore holes 1a and 1b are shown. The geophones 5 are shown as two arrays, mutually parallel and each aligned with one of the bore holes. The arrangement is such that the bore holes are displaced from each other longitudinally respecting the arrays and, of course, laterally also. Various distances of displacements may be used, the lateral and longitudinal displacement used being possibly from 50 to 150 feet. The bore holes, of course, establish the shot points.

The making of one record has already been described and if this record was made by shooting in the bore hole 1a, for example, with the signals obtained with the geophones aligned with this shot point, a second record is then made to obtain the signals from the same geophones but with the shot point shifted to the hole 1b. Next the geophone array aligned with the hole 1b is used to obtain two more records obtained respectively by shooting successively in the holes 1b and 1a. If desired, more records may be made by shooting in the same holes but at different depths. The result is a group of records.

Figure 3:
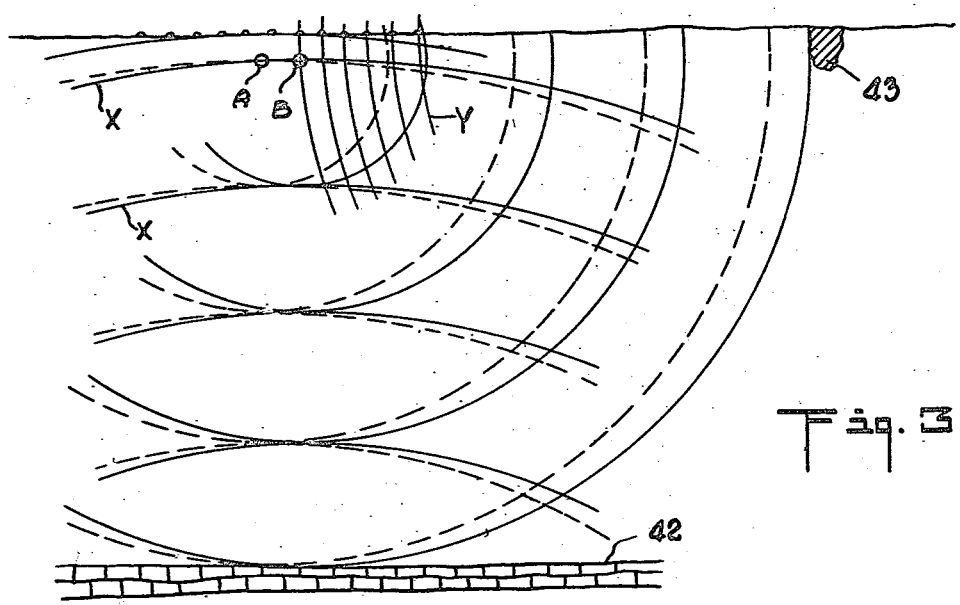
Fig. 3 is a vertical section of the earth illustrating the wave reflection and interference or noise phenomena.

Going now to Fig. 3 note that the desired event reflected from the reflector 42 arrives at all of the geophones at substantially the same time, regardless of the geophone array and regardless of whether or not the shot point is in the bore hole 1a or 1b. This is shown symbolically by the wave front traces x. A scatterer is shown at 43 as being approximately in alignment with the geophone arrays and as can be seen in the drawing, wave front traces y reflected from this scatterer arrive at different times respecting each of the geophones. This represents an instance of but a single scatterer and it is aligned with the geophone array.

Figure 4:
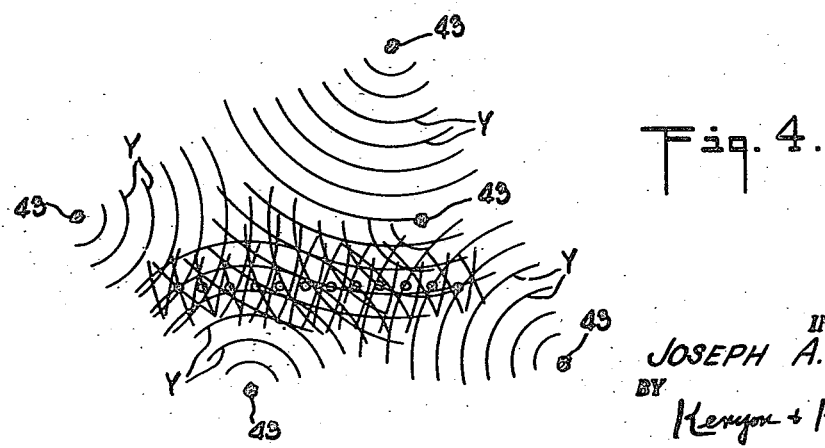
Fig. 4 is a plan section of the earth showing the interference or noise phenomenon.

Reference to Fig. 4 serves to illustrate how with any one of the two geophone arrays a large number of the scatterers 43 offset more or less laterally respecting the array also reflect wave front traces which arrive at different times respecting the different geophones. In the case of a scatterer positioned broadside to a single array there may be an approach to a condition where the undesired reflections arrive almost at the same time, but the use of two arrays, as shown by Fig. 2, or the use of two shot points displaced laterally respecting the array, provide for the recording of a group of records which collectively record the desired event substantially alike as to time while recording the reflections from the scatterer which is offset laterally as described, differently respecting time. It is to be understood that instead of actually using two geophone strings, a single string may be used and shifted to provide the arrangements described.

Now having obtained a group of records the next step is the summation or compositing.

The compositing apparatus shown by Fig. 5 comprises a vertical spindle 44 which is rotated through an appropriate drive by a motor 44a. The arrangement is such that this spindle turns as exactly as possible at the speed with which the spindle 10 was turned during the recording. The spindle passes rotatively through a series of decks 45 which are non-rotatively supported by a frame 46. The various magnetic recordings obtained as described, are mounted individually on the spindle 44 so that one of the records is above each of the decks 45. These decks each mount a rotative carrier 47 which may be rotated by a micrometer screw 48 and which is provided with an azimuth indicator pointer 49 which plays over an azimuth scale 50 associated with the non-rotative deck 45. Each rotative carrier 47 mounts a plurality of pickups 51 of which there should be one for each of the previously described traces. As to each deck all of the pickups should be oriented relative to each other as exactly as possible as were the corresponding recording heads 9 used during the recording. These pickups may be of the magnetically actuated type used in conjunction with playing back magnetic recordings.

It will be remembered that during the recording each geophone is connected with its individual recording head. Therefore, with the pickups 51 geometrically oriented as were the recording heads throughout all of the decks, the respective outputs from all of the pickups positioned and oriented throughout the various decks so as to correspond with any given one of the record heads, now is available for compositing.

As shown by Fig. 5, the corresponding pickups for any one geophone phonographic representation are interconnected by lines 52 which are fed to the input of a suitable amplifier 53 and from its output to one of the inputs of an oscillographic recorder 53a of the type usually used to record from the geophones. What might be called the next set of pickups are then interconnected by the lines 54, fed through a suitable amplifier 55 and from there into another of the inputs of the oscillograph. This is done throughout all of the traces excepting for the trace of the shot point instant. The various pickups of the recording apparatus which are associated with the shot point instant traces are all interconnected by lines 56 to the input of a cathode ray oscilloscope 57. Preferably each of the shot point instant pickups is provided with a shorting switch 58 so that these pickups may be connected selectively to the oscilloscope 57.

With the records 12 rotating and the shot point instant pickups active, the purpose of the oscilloscope 57 is to permit adjustments in azimuth of each individual record to make their respective shot instants coincide as a function of time. With any two of the pickups connected with the input of the oscilloscope 57 and with the other pickups shorted out, it is possible to adjust the screws 48 of the carriers on the decks associated with these pickups until the shot point instants seen in the screen of the oscilloscope 57 are brought into coincidence. Then using one of these orientations as a standard and by appropriate use of the switches 58 one after another of the balance of the disks may be adjusted in azimuth until all of the shot point instants coincide. In case the shot points were at different depths, appropriate compensation for this may be made by calculated azimuth displacements by using the pointer 49 and scale 50 of the appropriate deck.

At the time the shot point instants are aligned it is convenient also to check that each of the original recordings was taken at identical speeds of the recording disk by noticing on the oscilloscope whether one timing signal is "crawling through" the other; and to check that the compositing speed is the same as the recording speed within required tolerances by comparing one of the timing trace signals with the accurately controlled constant alternating voltage applied to the motor 11, by means of a Lissajous figure on the face of the oscilloscope.

With the foregoing adjustments made the disks are simultaneously played back so as to obtain a record from the oscillograph with each curve on the record representative of one geophone or of one common multiplicity of geophones but with the recorded result representing a composite of the four shootings. Since as previously explained the desired event arrived in each instance at substantially the same time, whereas the undesired scatterings or noise arrived at random times, it follows that as to each curve the desired event is reinforced whereas the undesired scatterings or noise is relatively diminished on the final record through mutual cancellation occurring to a greater or lesser degree respecting all of the undesired scattered energy.

As previously indicated, the motor 11 is an alternating current motor of the type that rotates at a constant speed if supplied with alternating current of constant frequency. There are known ways to provide a source of such current and therefore an illustration of the same is considered unnecessary. The manner of feeding a small fraction of this current to one of the recording heads, to provide a time trace, is considered adequately clear to eliminate the need for its illustration also.

Fig. 5 shows that each reproducing head 51 is mounted on its deck 45 by an arm 45a extending to the deck's peripheral portion where it is mounted by a bracket 45b constructed to permit an azimuth adjustment and having an azimuth adjusting micrometer screw 48a. Each of these screws may be provided with a motor drive for turning it at known speeds to adjust each of the heads individually in azimuth to introduce any small variable relative time differences required and as previously mentioned.

The above also makes provision for any fixed but non-identical weathering corrections by providing for adjustments of the individual heads as required. The screws 48a may be manually actuated for the just mentioned purpose and need not be motorized. Also, the brackets 45b should be capable of being locked when once adjusted.

I claim:

1. Geophysical seismic exploration apparatus including means for moving simultaneously a plurality of phonographic records each having a plurality of recorded traces, a plurality of reproducing units arranged to reproduce simultaneously from said traces, there being a unit for each of the traces and a group of the units as to each of the records, a common circuit for each of the corresponding units throughout the groups, means including a recorder connected to said units by said circuits for additively combining the signals reproduced by said corresponding units, first adjustable means for moving each of the reproducing units with respect to its record in order to correct for time differences existing between the traces, and second adjustable means for moving each of said groups in unison relative to the movement of said records and respecting the other groups in order to correct for time differences existing between the records.

2. Geophysical seismic exploration apparatus including means for moving simultaneously a plurality of phonographic records each having a plurality of recorded traces, a plurality of reproducing units arranged to reproduce simultaneously from said traces, there being a unit for each of the traces and a group of the units as to each of the records, a common circuit for each of the corresponding units throughout the groups, means including a recorder connected to said units by said circuits for additively combining the signals reproduced by said corresponding units, first adjustable means for moving each of the reproducing units with respect to its record in order to correct for time differences existing between the traces, and second adjustable means for moving each of said groups in unison relative to the movement of said records and respecting the other groups in order to correct for time differences existing between the records, each of said records having a detonation instant trace and the units reproducing therefrom in each of said groups having a common circuit combining their reproduction outputs, and means for producing simultaneous visual representations of two or more of said outputs in order to indicate the phase relationship therebetween and, hence, to facilitate adjustment of said second adjustable means.

3. Geophysical seismic exploration apparatus including a plurality of seismic energy detectors, an explosive detonating circuit, an endless movable phonographic record, a plurality of phonographic recording units arranged to make separate recorded traces on said record, circuits connecting said detectors to said units so that each detector has a recording unit, a detonating switch for controlling said detonating circuit, activating and deactivating switches for controlling said circuits to said units, and means moving with said record for actuating said switches, said switches being arranged respecting said actuating means in succession so that said activating, said detonating and said deactivating switches are in this order successively actuated by said actuating means, said recording units being arranged in a group having a predetermined pattern respecting said record, and means for moving simultaneously a group of said phonograph records with the traces recorded thereon, a group of phonographic reproducing units for each of said records with said reproducing units arranged in the predetermined pattern of said recording units in each instance, first adjustable means for moving each of said reproducing units with respect to its record in order to correct for time differences existing between the traces, second adjustable means for moving each group of reproducing units in unison with respect to said records and to the other groups in order to correct for time differences existing between the records, and means for combining and recording the outputs of corresponding units thoughout the various groups of reproducing units.

4. Geophysical seismic exploration apparatus including a plurality of seismic energy detectors, an explosive detonating circuit, an endless movable phonographic record, a plurality of phonographic recording units arranged to make separate recorded traces on said record, circuits connecting said detectors to said units so that each detector has a recording unit, a detonating switch for controlling said detonating circuit, activating and deactivating switches for controlling said circuits to said units, and means moving with said record for actuating said switches, said switches being arranged respecting said actuating means in succession so that said activating, said detonating and said deactivating switches are in this order successively actuated by said actuating means, said recording units being arranged in a group having a predetermined pattern respecting said record, and means for moving simultaneously a group of said phonograph records with the traces recorded thereon, a group of phonographic reproducing units for each of said records with said reproducing units arranged in the predetermined pattern of said recording units in each instance, first adjustable means for moving each of said reproducing units with respect to its record in order to correct for time differences existing between the traces, second adjustable means for moving each group of reproducing units in unison with respect to said records and to the other groups in order to correct for time differences existing between the records, means for combining and recording the outputs of corresponding units throughout the various groups of reproducing units, one of the traces on each of said records including an indexing signal and the units reproducing signals therefrom in each of said groups having a common circuit supplied by their reproduction outputs, and means responsive to two or more of said outputs for visually indicating the phase relationship between the indexing signals in order to facilitate adjustment of said second adjustable means.

References Cited in the file of this patent

UNITED STATES PATENTS

| Number | Name | Date |
|---|---|---|
| 2,018,737 | Owen | Oct. 29, 1935 |
| 2,088,588 | Dudley | Aug. 3, 1937 |
| 2,243,730 | Ellis | May 27, 1941 |
| 2,313,091 | Renner | Mar. 9, 1943 |
| 2,394,990 | Eisler et al. | Feb. 19, 1946 |
| 2,427,421 | Rieber | Sept. 16, 1947 |
| 2,578,133 | Hawkins | Dec. 11, 1951 |
| 2,604,955 | Hawkins | July 29, 1952 |
| 2,620,890 | Lee et al. | Dec. 2, 1952 |
| 2,628,689 | Rieber | Feb. 17, 1953 |
| 2,732,906 | Mayne | Jan. 31, 1956 |